(12) United States Patent
Srb-Gaffron et al.

(10) Patent No.: US 9,599,201 B2
(45) Date of Patent: Mar. 21, 2017

(54) POLYGON COMPENSATION COUPLING FOR CHAIN AND SPROCKET DRIVEN SYSTEMS

(75) Inventors: Walter Srb-Gaffron, Baden (AU); Alexander Turek, Vienna (AU)

(73) Assignee: OTIS ELEVATOR COMPANY, Farmington, CT (US)

( * ) Notice: Subject to any disclaimer, the term of this patent is extended or adjusted under 35 U.S.C. 154(b) by 351 days.

(21) Appl. No.: 14/110,070

(22) PCT Filed: May 23, 2011

(86) PCT No.: PCT/US2011/037553
§ 371 (c)(1),
(2), (4) Date: Oct. 4, 2013

(87) PCT Pub. No.: WO2012/161691
PCT Pub. Date: Nov. 29, 2012

(65) Prior Publication Data
US 2014/0066240 A1    Mar. 6, 2014

(51) Int. Cl.
*F16H 7/20*    (2006.01)
*B66B 23/02*    (2006.01)

(52) U.S. Cl.
CPC ............ *F16H 7/20* (2013.01); *B66B 23/022* (2013.01)

(58) Field of Classification Search
CPC ............ F16H 21/00; F16H 7/20; B66B 21/00
USPC .................................... 474/94; 198/321, 326
See application file for complete search history.

(56) References Cited

U.S. PATENT DOCUMENTS

| | | | |
|---|---|---|---|
| 1,956,714 A * | 5/1934 | Graff-Baker | B66B 23/02 198/330 |
| 4,498,890 A | 2/1985 | Sutherland et al. | |
| 5,306,212 A * | 4/1994 | Eberle | B65G 21/22 474/140 |
| 6,637,579 B2 | 10/2003 | Pietz | |
| 6,685,004 B2 | 2/2004 | Fargo et al. | |
| 6,834,754 B2 | 12/2004 | Pietz | |
| 6,874,613 B2 | 4/2005 | Pietz | |
| 6,892,874 B2 | 5/2005 | Pietz | |
| 6,955,254 B2 | 10/2005 | Krampl | |
| 6,988,608 B2 | 1/2006 | Pietz | |
| 7,077,257 B2 | 7/2006 | Pietz | |
| 7,195,115 B2 | 3/2007 | DePaso | |

(Continued)

FOREIGN PATENT DOCUMENTS

| CN | 201125118 Y | 10/2008 |
|---|---|---|
| CN | 101868652 A | 10/2010 |

(Continued)

OTHER PUBLICATIONS

Office Action issued in corresponding Chinese Patent Application No. 201180071057.5; Action dated Aug. 19, 2014.

(Continued)

*Primary Examiner* — Michael Mansen
*Assistant Examiner* — Mark K Buse
(74) *Attorney, Agent, or Firm* — Cantor Colburn LLP (57) ABSTRACT

A polygon compensation coupling system for reducing a polygon effect in a chain driven system is disclosed. The polygon compensation coupling system may include a chain sprocket and a main drive in engagement with the chain sprocket, such that the engagement defines a compensation curve to reduce the polygon effect.

12 Claims, 11 Drawing Sheets

(56) References Cited

U.S. PATENT DOCUMENTS

| | | | |
|---|---|---|---|
| 7,296,671 B2 | 11/2007 | Pietz | |
| 7,442,139 B2 | 10/2008 | Kubo et al. | |
| 7,665,595 B2 * | 2/2010 | Matheisl | B66B 23/026 198/330 |
| 7,686,152 B2 | 3/2010 | Gozalez et al. | |
| 7,918,326 B2 * | 4/2011 | Illedits | B66B 23/026 198/330 |
| 8,286,778 B2 * | 10/2012 | Grobbel | B66B 23/026 198/329 |
| 2002/0142873 A1 * | 10/2002 | Oser | B66D 3/18 474/141 |
| 2003/0083165 A1 * | 5/2003 | Hessberger | B21C 1/30 474/141 |
| 2003/0121756 A1 * | 7/2003 | Copeland | B66B 23/022 198/326 |
| 2004/0134760 A1 | 7/2004 | Pietz | |
| 2005/0061609 A1 * | 3/2005 | Pietz | B66B 25/00 198/330 |
| 2006/0011450 A1 | 1/2006 | Fargo et al. | |
| 2006/0073926 A1 * | 4/2006 | Kelm | F01L 1/02 474/141 |
| 2007/0235284 A1 * | 10/2007 | Ishikawa | B65G 21/22 198/326 |
| 2009/0308712 A1 * | 12/2009 | Grobbel | B66B 23/026 198/330 |
| 2010/0255944 A1 | 10/2010 | Grobbel | |

FOREIGN PATENT DOCUMENTS

| | | |
|---|---|---|
| DE | 10218374 A1 | 11/2003 |
| EP | 1344740 A1 | 9/2003 |
| EP | 1728755 A1 | 6/2006 |
| EP | 2033928 A1 | 11/2009 |
| EP | 2471737 A1 | 7/2012 |
| FR | 537666 A | 5/1922 |
| GB | 2243430 A | 10/1991 |
| JP | 2005/231878 A | 9/2005 |
| JP | 2009/280352 | 12/2009 |
| WO | WO 02/085771 A2 | 10/2002 |
| WO | 03036129 A1 | 5/2003 |

OTHER PUBLICATIONS

International Search Report and Written Opinion for Corresponding International Application No. PCT/US2011/37553 filed May 23, 2011.No. PCT/US2011/37553 filed May 23, 2011.

German Office Action for application DE 112011105280.4, dated May 6, 2016, 10 pages.

* cited by examiner

POLYGON COMPENSATION COUPLING FOR CHAIN AND SPROCKET DRIVEN SYSTEMS

CROSS-REFERENCE TO RELATED APPLICATIONS

This application is a U.S. national stage filing under 35 USC §371 of International Patent Application No. PCT/US11/37553, filed on May 23, 2011.

FIELD OF THE DISCLOSURE

The present disclosure generally relates to chain and sprocket driven systems and, more particularly, relates to minimizing a polygon effect associated with chain and sprocket driven systems, such as, passenger conveyor systems.

BACKGROUND OF THE DISCLOSURE

Several types of passenger conveyor systems, such as, escalators, moving walkways, moving sidewalks, etc. are widely used these days to effectively transport pedestrian traffic (or other objects) from one location to another. Areas of usage of these passenger conveyor systems often include airports, hotels, shopping malls, museums, railway stations and other public buildings. Such passenger conveyor systems typically have two landings (e.g., a top landing and a bottom landing) that bridge a truss structure. Moving handrails, as well as a plurality of steps/treads guided by a step chain (also called an escalator chain) in a loop transport the pedestrian traffic between the two landings. The step chain can be guided (e.g., driven) by a step chain sprocket. In particular, the passenger conveyor systems generally include a drive module having a motor and a main shaft, which drives one or more main drive chain sprockets, which in turn drives the step chain sprocket for moving the plurality of steps in the endless loop.

The interaction of the step chain with the step chain sprocket often produces fluctuations and vibrations. By way of background, a step chain includes a plurality of discrete step chain links connected together by way of connecting links, such as, a pin and a link plate or a roller, while a sprocket (e.g., the step chain sprocket) includes a profiled wheel having a plurality of engaging teeth for meshing and engaging the connecting links (or possibly even engaging the step chain links) of the step chain for moving the step chain as the step chain sprocket rotates. The engagement of the connecting links of the step chain with the engaging teeth of the step chain sprocket causes the step chain to vibrate and fluctuate. These vibrations and fluctuations are often called a polygon effect or a chordal action and not only affect the ride experience of a user (who typically feels these vibrations and fluctuations aboard the passenger conveyor system), but it also causes undesirable friction between the step chain and the step chain sprocket, thereby reducing the lifespan of those components. Noise generated by the vibrations resulting from the engagement of the step chain with the step chain sprocket is another concern.

Therefore, mitigating or compensating the polygon effect is desirable. Several solutions to reduce or otherwise mitigate the polygon effect have been proposed in the past. Generally speaking, the intensity of polygon effect depends upon the velocity (frequency) of the step chain and the amplitude of the step chain pitch—step chain sprocket pitch. The greater the step chain pitch, the higher the polygon effect. To reduce the polygon effect, therefore, the pitch of the step chain can be reduced. Thus, one approach of mitigating the polygon effect involves increasing the number of step chain links in the step chain (which can reduce the step chain pitch), and/or correspondingly increasing the diameter of the step chain sprocket(s) to increase the number of teeth thereon (which may also effectively reduce the step chain pitch). This technique, although effective in improving the riding experience of a user, nonetheless has several disadvantages.

For example, due to the increase in the number of the parts (e.g., increase in the number of step chain links and other associated parts, such as, rollers, pins, bushings, link plates, etc., of the step chain, and/or a bigger sprocket), the overall cost of the associated system increases. Furthermore, the maintenance involved with the upkeep of the increased number of components goes up as well, and so does the amount of lubricant needed to reduce the increased wear and tear amongst those components. This increased wear and tear can additionally reduce the lifespan of the step chain and the step chain sprocket. Moreover, the aforementioned approach does not address the noise issue discussed above, and may in fact increase the noise due to a greater engagement of the step chain with the step chain sprocket.

Accordingly, there is a need for an effective solution to compensate the polygon effect that does not suffer from the disadvantages mentioned above. Particularly, it would be beneficial if a polygon compensation technique were to be developed that improved the riding experience of the users without incurring any additional costs associated with increasing the step chain links or using a bigger step chain sprocket. It would further be beneficial if such a technique were reliable, easy to maintain, increased (or at least did not negatively impact) the lifespan of the step chain and the step chain sprocket (e.g., by reducing wear and tear), and additionally provided a greener approach (by using less lubricant) to solving the polygon effect problem. It would additionally be desirable if this technique reduced the noise generated by the step chain and the step chain sprocket engagement.

SUMMARY OF THE DISCLOSURE

In accordance with one aspect of the present disclosure, a polygon compensation coupling system is disclosed. The polygon compensation coupling system may include a chain sprocket and a main drive. The main drive may be in engagement with the chain sprocket such that the engagement may define a compensation curve to reduce a polygon effect.

Additionally, the chain sprocket of the polygon compensation coupling system may include a plurality of compensation holes, each of the plurality of compensation holes may be approximately equally spaced circumferentially apart from one another. Furthermore, the main drive may be engaged to the chain sprocket through each of the plurality of compensation holes by a respective axle, such that rotation of the main drive causes rotation of each of the respective axle within each of the plurality of compensation holes in accordance with the compensation curve.

Alternatively, the chain sprocket of the passenger conveyor system may have a first plurality of engagement surfaces and the main drive may have a corresponding number of second plurality of engagement surfaces such that rollers sliding in the corresponding first and the second plurality of engagement surfaces of the chain sprocket and the main drive define a stationary compensation curve.

Additionally, the main drive and the chain sprocket may rotate with non-constant instantaneous angular velocities, while maintaining constant average angular velocities, such that linear speed of a chain may be kept substantially constant.

In accordance with another aspect of the present disclosure, a passenger conveyor system is disclosed. The passenger conveyor system may include a plurality of treads guided by a step chain in an endless loop about a step chain sprocket for transporting objects from one location to another. The step chain sprocket may include a plurality of compensation holes. The passenger conveyor system may additionally include a main drive in engagement with the step chain sprocket by a plurality of axles, the engagement defined by a compensation curve as the step chain sprocket and the main drive rotate with constant average angular velocities but non-constant instantaneous angular velocities.

In accordance with yet another aspect of the present disclosure, a method of reducing a polygon effect in a chain driven system is disclosed. The method may include providing a chain moving in an endless loop guided by a chain sprocket and a main drive. The method may further include engaging the chain sprocket with the main drive and rotating the chain sprocket and the main drive with constant average angular velocities but non-constant instantaneous angular velocities. The method may further include providing a compensation curve to maintain a substantially constant linear speed of the chain.

Additionally, the method may include providing the chain sprocket with a plurality of compensation holes and connecting the main drive to the chain sprocket through the plurality of compensation holes by way of a plurality of axles. Furthermore, the method may include guiding the plurality of axles within the plurality of compensation holes to define the compensation curve.

Alternatively, the method may include providing each of the chain sprocket and the main drive with a plurality of engagement surfaces and providing a stationary compensation curve defined by rollers sliding in corresponding engagement surfaces of the chain sprocket and the main drive.

Additionally or alternatively, the invention may include one or more of the following features separately or in combination:
  wherein a main drive and a chain sprocket are mounted to a main drive shaft for rotation;
  wherein a chain sprocket and a main drive rotate with constant average angular velocity;
  wherein a chain sprocket and a main drive rotate with non-constant instantaneous angular velocities;
  wherein a chain sprocket and a main drive have non-constant instantaneous angular velocities while maintaining constant average angular velocities;
  wherein non-constant instantaneous angular velocities of a main drive and a chain sprocket causes a linear speed of a chain to be kept substantially constant;
  wherein a main drive is a main drive chain sprocket; and/or
  wherein a main drive is driven substantially directly by way of gears, axles, and/or motors and the like.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail on the accompanying drawings, wherein.

While the following detailed description has been given and will be provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims eventually appended hereto.

DETAILED DESCRIPTION OF THE DISCLOSURE

Figure 1A:
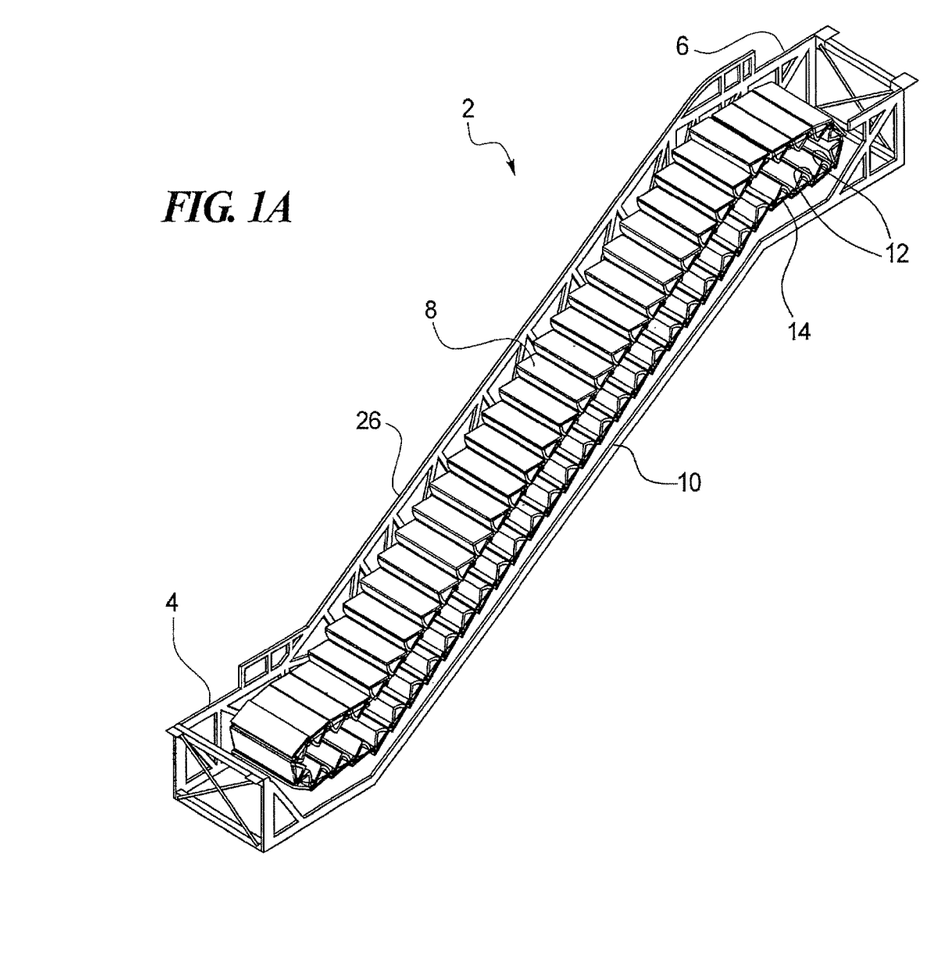
FIG. 1A shows a simplified schematic diagram of a passenger conveyor system, in accordance with at least some embodiments of the present disclosure.
Figure 1B:
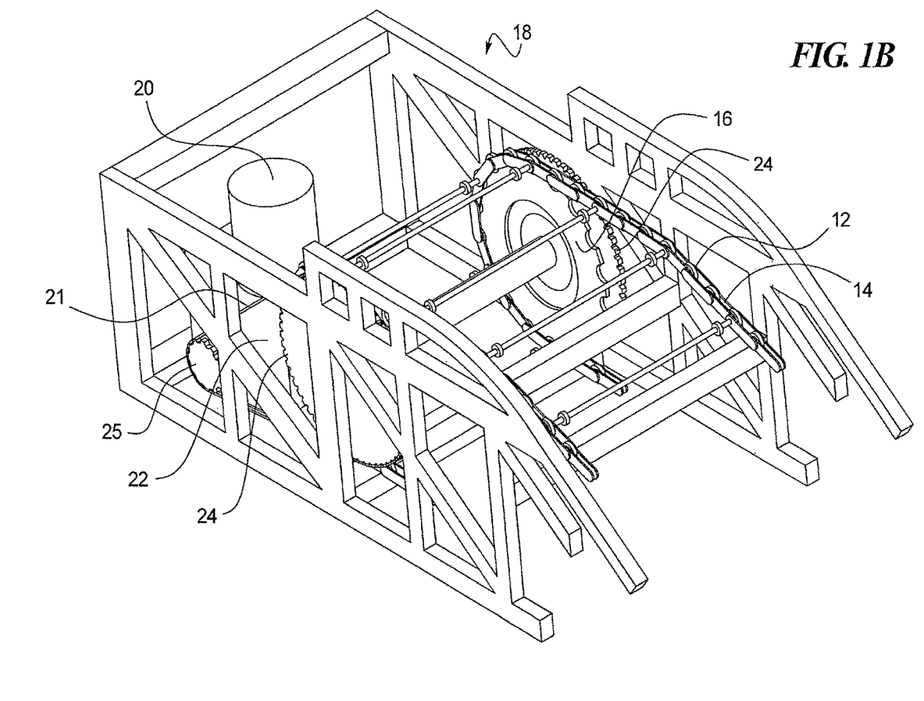
FIG. 1B shows a portion of the passenger conveyor system of FIG. 1 in greater detail.

Referring now to FIGS. 1A and 1B, an exemplary passenger conveyor system 2 is shown, in accordance with at least some embodiments of the present disclosure. Although the passenger conveyor system 2 shown is an escalator, it will be understood that the passenger conveyor system is representative of various types of chain driven mechanisms that engage a drive chain having discrete links engaged with a toothed sprocket. Furthermore, the passenger conveyor system 2 need not always be at an incline as shown. Rather, in at least some embodiments, the passenger conveyor system 2 may be horizontal as in a moving walk, curved, spiral or may define any other commonly employed configuration.

While all of the components of the passenger conveyor system 2 have not been shown, a typical passenger conveyor system of the type that may be employed for purposes of the present disclosure may include a bottom landing 4 connected to a top landing 6 via a plurality of steps (also referred to herein as treads) 8 and a truss 10. A step chain 12 having a plurality of step chain links 14 may be connected to the plurality of treads 8 to guide and move those steps in an endless loop via a step chain sprocket 16 (See FIG. 1B) between the top landing 6 and the bottom landing 4. As shown in FIG. 1B, the passenger conveyor system 2 may additionally include a drive module 18. The drive module 18 may be provided beneath the top landing 6 and may include a motor 20, which may at least indirectly drive a main drive shaft 22 having a machine drive chain sprocket 25. The machine drive chain sprocket 25 in turn may drive a main drive chain 21 to which is engaged a main drive chain sprocket 24. The main drive chain (MDC) sprocket 24 may engage with, and rotate concurrently with, the step chain (STC) sprocket 16 to move the step chain 12. The passenger conveyor system 2 may further include a pair of moving handrails 26 (only one of which is shown in FIG. 1A).

Notwithstanding the components of the passenger conveyor system 2 described above, it will be understood that several other components, such as, gearbox, brakes, etc., that are commonly employed in passenger conveyor systems are contemplated and considered within the scope of the present disclosure. It will also be understood that while several of the components, such as, the machine drive chain sprocket 25 and the main drive sprocket 24 of the drive module 18 described above are driven by chains, in at least some embodiments, one or more of those components may be driven by belts or other commonly employed mechanisms. Furthermore, in at least some embodiments, the main drive shaft 22 may directly drive (by way of belts or chains) the MDC sprocket 24, without the usage of the machine drive chain sprocket 25 and the main drive chain 21. In yet other embodiments, the main drive shaft 22 may directly drive (by belts or chains) the STC sprocket 16 without the usage of the machine drive chain sprocket 25 or the MDC sprocket 24.

Figure 2:
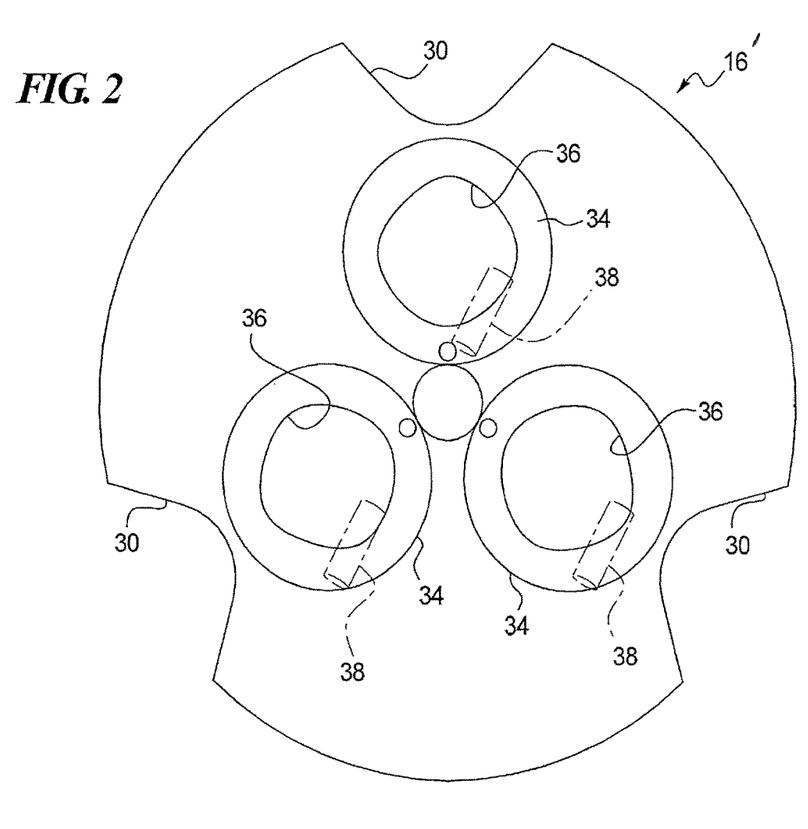
FIG. 2 shows a front view of a step chain sprocket of the passenger conveyor system of FIG. 1, in accordance with at least some embodiments of the present disclosure.

Referring now to FIG. 2, a front view of the step chain (STC) sprocket 16' is shown, in accordance with at least some embodiments of the present disclosure. As shown, the STC sprocket 16' may be a round (or substantially round) disk or wheel and may be mounted to the main drive shaft 22. The STC sprocket 16' may additionally include a plurality of teeth 30 formed along a circumference thereof, to engage connecting links (e.g., in the form of rollers) 32 (See FIG. 3) of the step chain 12 as the STC sprocket rotates to move the step chain thereabout. Notwithstanding the fact that in the present embodiment, only three of the teeth 30 have been shown in the STC sprocket 16', in other embodiments, the number of teeth may vary.

Also formed on a front surface of the STC sprocket 16', are three compensation holes 34. As will be noted, each of the compensation holes 34 is not circular, but rather defines an eccentric path 36 for an axle/roller 38 (shown in phantom in FIG. 2) to follow as the STC sprocket 16' and the MDC sprocket 24 rotate to move the step chain 12. In so doing, the eccentric path 36 defines a compensation curve 42, described below with respect to FIG. 7, which may serve to reduce the polygon effect described above. In particular, the compensation curve 42 may vary the angular velocity of the STC sprocket 16' in order to maintain a constant speed (e.g., linear speed) of the step chain 12 as the step chain engages and moves about the STC sprocket, thereby minimizing (or possibly even completely eliminating) the polygon effect.

With respect to the compensation holes 34, in at least some embodiments, they may be arranged in a triangular configuration 120° apart towards a center portion of the STC sprocket 16', adjacent to the teeth 30 and abutting the main drive shaft 22. Although in the present embodiment, three compensation holes 34 have been shown, in at least some other embodiments, the number of compensation holes may vary and the number of compensation holes need not correspond to the number of teeth 30 on the STC sprocket 16'. Furthermore, the positioning of those holes may vary as well and they need not always be positioned adjacent to the teeth 30 of the STC sprocket 16' or be separated from one another by a 120°. Additionally, although all of the compensation holes 34 have been shown to have the same geometric shape, in at least some embodiments, one or more of the compensation holes 42 may have varying radii or shapes other than that depicted. The intent of the engagement between the shaped compensation holes 34 and the axles/rollers 38 is to follow the compensation curve as defined in the following figures.

Figure 3:
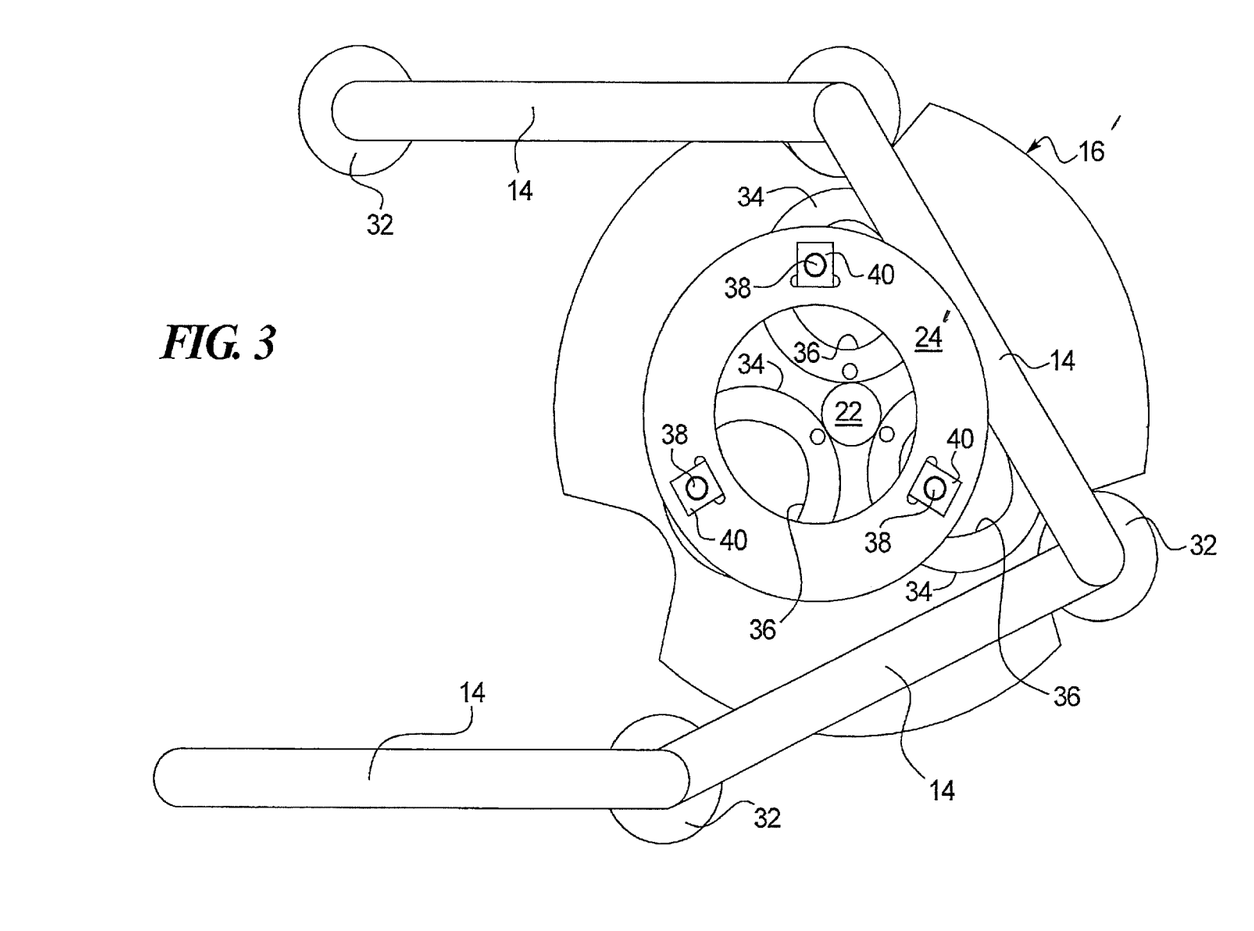
FIG. 3 shows a schematic front view of a first embodiment of a polygon compensation coupling system employed within the passenger conveyor system of FIG. 1.
Figure 4:
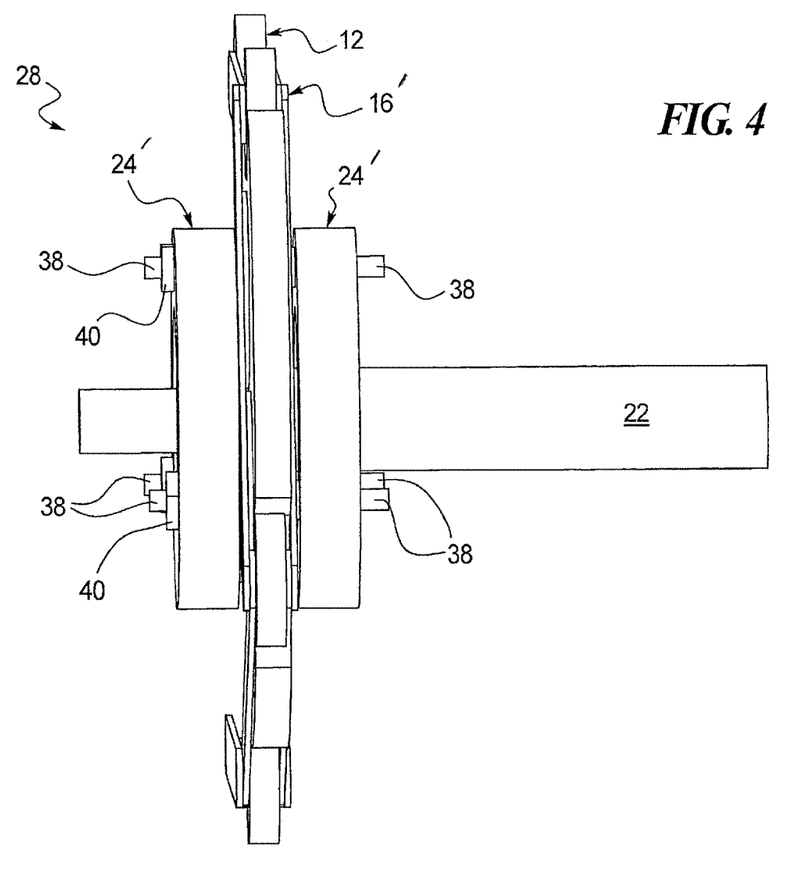
FIG. 4 shows a side view of the polygon compensation coupling system of FIG. 3.

Referring now to FIGS. 3 and 4, a polygon compensation coupling system 28 is shown, in accordance with at least some embodiments of the present disclosure. As shown, the step chain 12 may be engaged with the STC sprocket 16', which in turn may be engaged with the MDC sprocket 24'. In particular, the STC sprocket 16' may be mounted to the main drive shaft 22, as mentioned above. The STC sprocket 16' may additionally be sandwiched between two of the MDC sprockets (also referred to herein as MDC rings) 24', one on either side of the STC sprocket, as shown in FIG. 4. The two MDC sprockets 24' may be connected to one another and held in position about the main drive shaft 22 and relative to the STC sprocket 16' by way of the axles (also referred to herein as rollers) 38 and plates 40. Particularly, each of the MDC sprockets 24' may be formed with a set of three corresponding holes (not visible) such that each of the axles 38 may be inserted through one of the two MDC sprockets 24', through one of the compensation holes 34 and out through the other of the two MDC sprockets. The axles 38 may be held in position by the plates 40. Other mechanisms to secure and hold the axles 38 in position may be employed in alternate embodiments.

Figure 5:
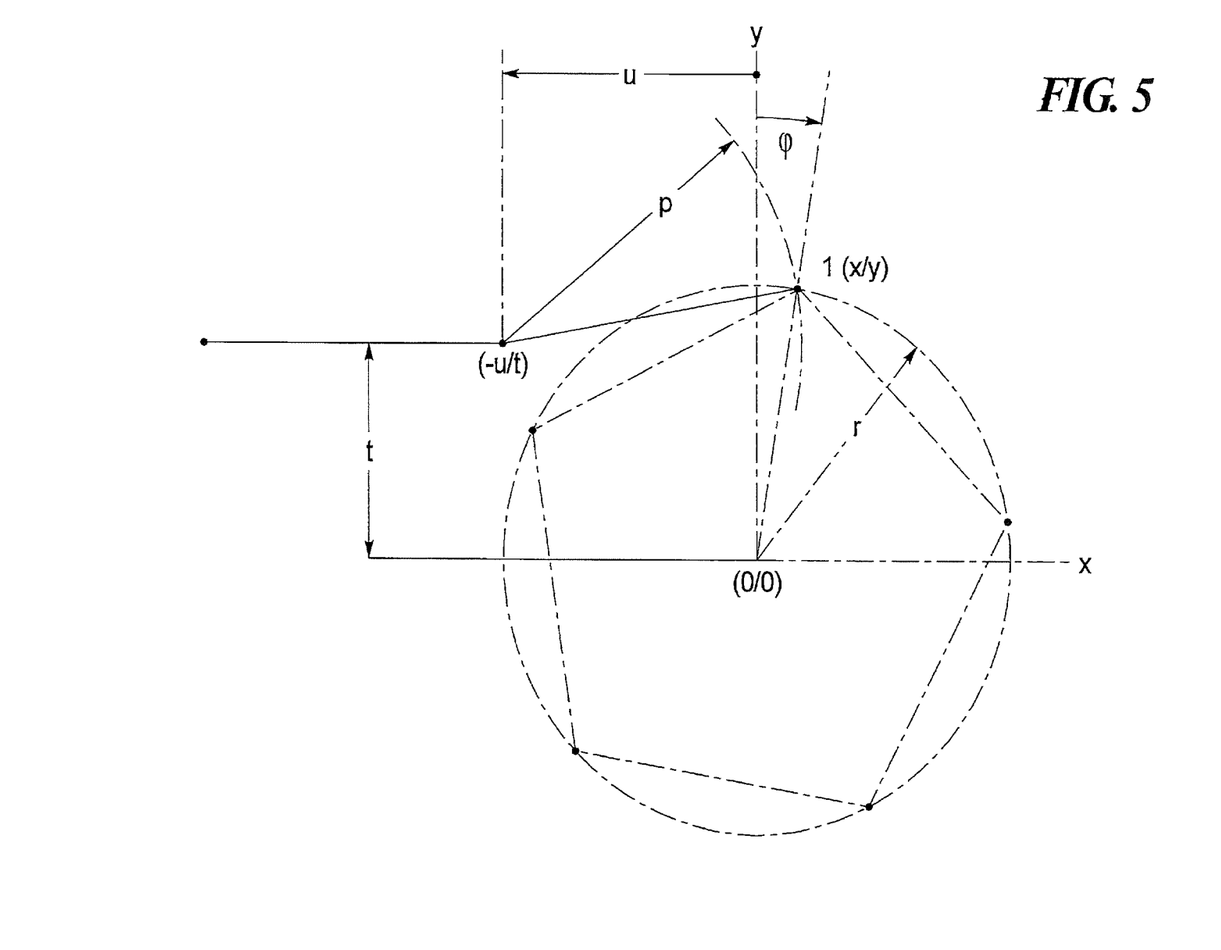
FIG. 5 shows a Cartesian coordinate system mathematical representation of a step one of determining a compensation curve equation of the polygon compensation coupling system.
Figure 6:
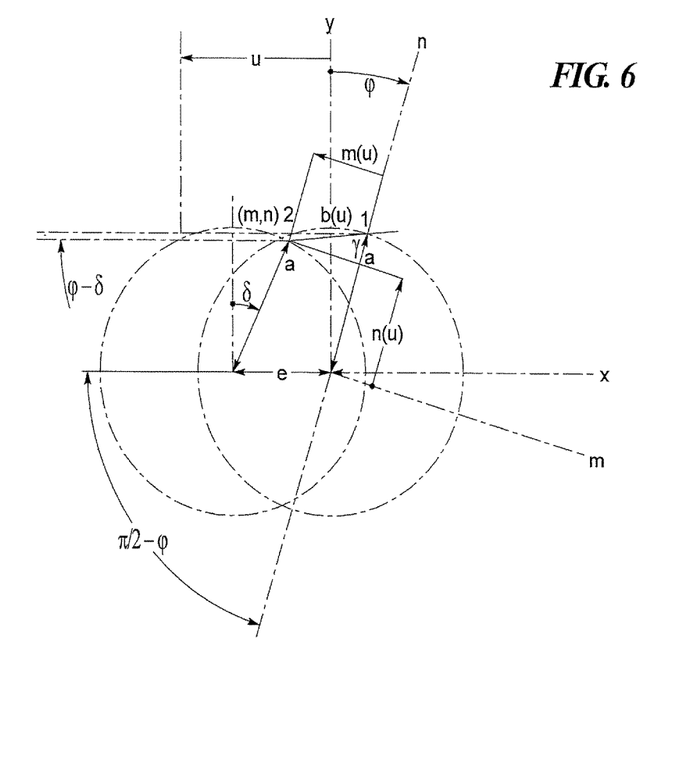
FIG. 6 shows a Cartesian coordinate system mathematical representation of a step two of determining the equation for the compensation curve of FIG. 5.

Furthermore, the axles 38 may connect the two MDC sprockets 24' in a manner such that as the MDC sprockets and the STC sprocket 16' rotate, the axles 38 roll/guide along and follow the eccentric path 36 of the compensation holes 34 to define the compensation curve 42. The geometry of the compensation curve 42 is shown in greater detail in FIG. 7. The compensation curve 42 may also be explained mathematically, as shown in FIGS. 5 and 6. By virtue of providing the compensation holes 34 in the STC sprocket 16' and rolling the axles 38 of the MDC sprockets 24' within the compensation holes to define the compensation curve 42, both the STC sprocket and the MDC sprocket made be turned a 360° in the same amount of time. Particularly, the MDC sprockets 24' may be made to rotate at a constant average angular velocity and the STC sprocket 16' may be made to rotate with the same average angular velocity but with a different (e.g., non-constant) relative angular velocity (i.e., different or non-constant instantaneous angular velocity) at any given point in the rotation, such that the difference in the angular velocities ensures that the step chain 12 is kept moving at a constant speed to compensate (or possibly even completely eliminate) the polygon effect. In other words, the relative difference in the instantaneous angular velocities of the STC sprocket 16' and the MDC sprocket 24' counteracts the polygon effect by a certain compensation curve (e.g., the compensation curve 42), which reduces or eliminates the polygon effect.

Turning now to FIGS. 5 and 6, a mathematical representation (e.g., equation) of the compensation curve 42 is shown, in accordance with at least some embodiments of the present disclosure. In particular, FIG. 5 shows a first step (e.g., a frame of reference) for determining an equation for the compensation curve 42, while FIG. 6 shows a second step in the determination thereof. Referring specifically to FIG. 5, first, a position and a velocity of a point one (1) with a coordinate u may be determined for every step chain link 14 of the step chain 12, as specified below. In the equations, p may refer to a radius of a circle equal to a pitch of a single step chain link 14, while r may refer to a radius of a circle equal to a pitch of the STC sprocket 16' and the crossing point one (1) may be the point of intersection of the circles p and r, and may have coordinates (x,y), in dependence of u (e.g., x(u), y(u)).

Thus, the position of point one (1) (x(u), y(u)) in a Cartesian coordinate system may be determined as follows:
Circle one equation:

$$(x-u)^2 + (y-t)^2 = p^2 \quad (1)$$

Circle two equation:

$$x^2 + y^2 = r^2 \quad (2)$$

Inserting (2) in (1):

$$a = ((u^2 + r^2 + t^2 - p^2)/2) \quad (3)$$

resulting in a common quadratic solution for x(u):

$$x_1 = \frac{au - Sqrt[-(a^2 * t^2) + r^2 * t^4 + r^2 * t^2 * u^2]}{t^2 + u^2} \quad (4a)$$

$$x_2 = \frac{au + Sqrt[-(a^2 * t^2) + r^2 * t^4 + r^2 * t^2 * u^2]}{t^2 + u^2} \quad (4b)$$

For a simplified specific case when $t=r$ \quad (5)

(4a) can be transformed to $$x = ((u*(-p^2 + 2*r^2 + u^2))/2 + Sqrt[r^6 + r^4*u^2 - (r^2*(-p^2 + 2*r^2 + u^2)^2)/4])/(r^2 + u^2) \quad (6)$$

With the pitch-radius correlation in the STC sprocket 16 with z teeth, a segment angle w may be expressed as $$w = p/z \quad (7)$$

and the radius r may be expressed by $$r = p/(2*Sin[w]) \quad (8)$$

for the constant term Sin [w]

$$Sin[w] = k \quad (9)$$

Thus, equation (8) may be written as $$p = 2*r*k \quad (10)$$

Inserting equation (10) in equation (6), x(u) may be written as follows:

$$x(u) = ((u*(2*r^2 - 4*k^2*r^2 + u^2))/2 + Sqrt[r^6 + r^4*u^2 - (r^2*(2*r^2 - 4*k^2*r^2 + u^2)^2)/4])/(r^2 + u^2) \quad (11)$$

from equation (1):

$$y = t - Sqrt[p^2 - (x-u)^2] \quad (12)$$

Inserting equations (5) and (10) in equation, (12):

$$y = r - Sqrt[(2*r*k)^2 - (x-u)^2] \quad (13)$$

and inserting equation (11) in equation (13) results in:

$$y(u) = r - Sqrt[(2*r*k)^2 - ((-u + ((u*(2*r^2 - 4*k^2*r^2 + u^2))/2 + Sqrt[r^6 + r^4*u^2 - (r^2*(2*r^2 - 4*k^2*r^2 + u^2)^2)/4])/(r^2 + u^2)))^2] \quad (14)$$

Subsequent to determining the position (coordinates of x(u), y(u))) of point one (1), the velocity of point one (1) in the x and the y directions may be determined as follows:
Differentiating equation (11) with respect to u results in the velocity of point one (1) in an x-direction:

$$x'(u) = (u^2 + (2*r^2 - 4*k^2*r^2 + u^2)/2 + (2*r^4*u - r^2*u*(2*r^2 - 4*k^2*r^2 + u^2))/(2*Sqrt[r^6 + r^4*u^2 - (r^2*(2*r^2 - 4*k^2*r^2 + u^2)^2)/4]))/(r^2 + u^2) - (2*u*((u*(2*r^2 - 4*k^2*r^2 + u^2))/2 + Sqrt[r^6 + r^4*u^2 - (r^2*(2*r^2 - 4*k^2*r^2 + u^2)^2)/4]))/(r^2 + u^2)^2 \quad (15)$$

while differentiating equation (14) with respect to u results in the velocity of point one (1) in a y-direction:

$$y'(u) = ((-1 + (u^2 + (2*r^2 - 4*k^2*r^2 + u^2)/2 + (2*r^4*u - r^2*u*(2*r^2 - 4*k^2*r^2 + u^2))/(2*Sqrt[r^6 + r^4*u^2 - (r^2*(2*r^2 - 4*k^2*r^2 + u^2)^2)/4]))/(r^2 + u^2) - (2*u*((u*(2*r^2 - 4*k^2*r^2 + u^2))/2 + Sqrt[r^6 + r^4*u^2 - (r^2*(2*r^2 - 4*k^2*r^2 + u^2)^2)/4]))/(r^2 + u^2)^2)*(-u + ((u*(2*r^2 - 4*k^2*r^2 + u^2))/2 + Sqrt[r^6 + r^4*u^2 - (r^2*(2*r^2 - 4*k^2*r^2 + u^2)^2)/4])/(r^2 + u^2)))/Sqrt[4*k^2*r^2 - (-u + ((u*(2*r^2 - 4*k^2*r^2 + u^2))/2 + Sqrt[r^6 + r^4*u^2 - (r^2*(2*r^2 - 4*k^2*r^2 + u^2)^2)/4])/(r^2 + u^2))^2] \quad (16)$$

and the absolute value of the velocity of point one (1) may be given by:

$$v(u) = Sqrt[x'(u)^2 + y'(u)^2] \quad (17)$$

From the velocity of point one (1), the acceleration of point one (1) may be determined by further differentiating the equations (15) and (16), with respect to u to obtain acceleration in the x- and the y-directions. Thus, differentiating equation (15) gives the acceleration of point one (1) in the x-direction as follows:

$$x''(u) = (6*u - ((16*k^2*r^4*u - 4*r^2*u^3)*(8*k^2*r^4*u - 2*r^2*u^3))/(2*(-16*k^4*r^6 - r^2*u^4 + 8*k^2*r^4*(2*r^2 + u^2))^{(3/2)}) + (8*k^2*r^46*r^2*u^2)/Sqrt[-16*k^4*r^6 - r^2*u^4 + 8*k^2*r^4*(2*r^2 + u^2)])/(2*(r^2 + u^2)) - (u*(2*r^2 - 4*k^2*r^2 + 3*u^2 + (8*k^2*r^4*u - 2*r^2*u^3)/Sqrt[-16*k^4*r^6 - r^2*u^4 + 8*k^2*r^4*(2*r^2 + u^2)]))/(r^2 + u^2)^2 - (u*((2 - 4*k^2)*r^2 + 3*u^2 + (8*k^2*r^4*u - 2*r^2*u^3)/Sqrt[-16*k^4*r^6 - r^2*u^4 + 8*k^2*r^4*(2*r^2 + u^2)]))/(r^2 + u^2)^2 + (4*u^2*((2 - 4*k^2)*r^2*u + u^3 + Sqrt[-16*k^4*r^6 - r^2*u^4 + 8*k^2*r^4*(2*r^2 + u^2)]))/(r^2 + u^2)^3 - ((2 - 4*k^2)*r^2*u + u^3 + Sqrt[-16*k^4*r^6 - r^2*u^4 + 8*k^2*r^4*(2*r^2 + u^2)])/(r^2 + u^2)^2 \quad (18)$$

and differentiating equation (16) gives the velocity of point one (1) in the y-direction as follows:

$$y''(u) = ((-4*k^2*r^2*u - u^3 + Sqrt[-16*k^4*r^6 - r^2*u^4 + 8*k^2*r^4*(2*r^2 + u^2)])*((6*u - ((16*k^2*r^4*u - 4*r^2*u^3)*(8*k^2*r^4*u - 2*r^2*u^3))/(2*(-16*k^4*r^6 - r^2*u^4 + 8*k^2*r^4*(2*r^2 + u^2))^{(3/2)}) + (8*k^2*r^4 - 6*r^2*u^2)/Sqrt[-16*k^4*r^6 - r^2*u^4 + 8*k^2*r^4*(2*r^2 + u^2)])/(2*(r^2 + u^2)) - (u*(2*r^2 - 4*k^2*r^2 + 3*u^2 + (8*k^2*r^4*u - 2*r^2*u^3)/Sqrt[-16*k^4*r^6 - r^2*u^4 + 8*k^2*r^4*(2*r^2 + u^2)]))/(r^2 + u^2)^2(u*((2 - 4*k^2)*r^2 + 3*u^2 + (8*k^2*r^4*u - 2*r^2*u^3)/Sqrt[-16*k^4*r^6 - r^2*u^4 + 8*k^2*r^4*(2*r^2 + u^2)]))/(r^2 + u^2)^2 + (4*u^2*((2 - 4*k^2)*r^2*u + u^3 + Sqrt[-16*k^4*r^6 - r^2*u^4 + 8*k^2*r^4*(2*r^2 + u^2)]))/(r^2 + u^2)^3 - ((2 - 4*k^2)*r^2*u + u^3 + Sqrt[-16*k^4*r^6 - r^2*u^4 + 8*k^2*r^4*(2*r^2 + u^2)])/(r^2 + u^2)^2))/(2*(r^2 + u^2)*Sqrt[4*k^2*r^2 - (4*k^2*r^2*u + u^3 - Sqrt[-16*k^4*r^6 - r^2*u^4 + 8*k^2*r^4*(2*r^2 + u^2)])^2/(4*(r^2 + u^2)^2)]) + ((-4*k^2*r^2 - 3*u^2 + (8*k^2*r^4*u - 2*r^2*u^3)/Sqrt[-16*k^4*r^6 - r^2*u^4 + 8*k^2*r^4*(2*r^2 + u^2)])*(-1 + (2*r^2 - 4*k^2*r^2 + 3*u^2 + (8*k^2*r^4*u - 2*r^2*u^3)/Sqrt[-16*k^4*r^6 - r^2*u^4 + 8*k^2*r^4*(2*r^2 + u^2)])/(2*(r^2 + u^2)) - (u*((2 - 4*k^2)*r^2*u + u^3 + Sqrt[-16*k^4*r^6 - r^2*u^4 + 8*k^2*r^4*(2*r^2 + u^2)]))/(r^2 + u^2)^2))/(2*(r^2 + u^2)*Sqrt[4*k^2*r^2 - (4*k^2*r^2*u + u^3 - Sqrt[-16*k^4*r^6 - r^2*u^4 + 8*k^2*r^4*(2*r^2 + u^2)])^2/(4*(r^2 + u^2)^2)]) - ((4*k^2*r^2*u + u^3 - Sqrt[-16*k^4*r^6 - r^2*u^4 + 8*k^2*r^4*(2*r^2 + u^2)])^2*(-32*k^4*r^6*u + u^2*(2*r^4*u + 3*r^2*Sqrt[-16*k^4*r^6 - r^2*u^4 + 8*k^2*r^4*(2*r^2 + u^2)] + u^2*Sqrt[-16*k^4*r^6 - r^2*u^4 + 8*k^2*r^4*(2*r^2 + u^2)]) + 4*k^2*(6*r^6*u - r^2*u^2*Sqrt[-16*k^4*r^6 - r^2*u^4 + 8*k^2*r^4*(2*r^2 + u^2)] + r^4*(2*u^3 + Sqrt[-16*k^4*r^6 - r^2*u^4 + 8*k^2*r^4*(2*r^2 + u^2)])))/(2*r^2*(r^2 + u^2)^6 *16*k^4*r^4*u^4 - 8*k^2*r^2*(2*r^2 + u^2))*((16*k^4*(r^6 - r^4*u^2) + 8*k^2*r^2*u^3*(3*r^2*u + u^3 + Sqrt[-16*k^4*r^6 - r^2*u^4 + 8*k^2*r^4*(2*r^2 + u^2)]) + u^3*

$$(r^2 * u - u^3 + 2 * \text{Sqrt}[-16 * k^4 * r^6 - r^2 * u^4 + 8 * k^2 * r^4 *$$
$$(2 * r^2 + u^2)])) / ((r^2 + u^2)^{\wedge} 2)^{\wedge}(3/2)) \quad (19)$$

and $$a = \text{Sqrt}[x^2 + y^2] \quad (20)$$

Subsequent to determining the position, velocity and acceleration of the point one (1) with respect to u, the position of a point two (2) located on the MDC sprocket 24' for every value of u projected on the STC sprocket 16' may be determined, as shown in FIG. 6, to obtain an equation for the compensation curve 42 on the STC sprocket. In particular, the STC sprocket 16' may turn with an angular velocity of $d\phi/dt$ and the acceleration $d^2\phi/dt^2$, and the compensation curve 42 may be determined by the curve of the point two (2), which is located on the MDC sprocket 24' turning with a constant angular velocity of $d\vartheta/dt$ relative to the STC sprocket. The coordinates of the point two (2) may be represented as (m, n) and the compensation curve 42 may be expressed as (m(u), n(u)). Furthermore, the point two (2) may also refer to the point of engagement of the axles 38 of the MDC sprocket 24' with the compensation holes 34 on the STC sprocket 16'.

A line connecting the points one (1) and two (2) may be expressed as follows:

$$b = \text{Sqrt}[(x_{1a} - x_2)^2 + (y_{1a} - y_2)^2] \quad (21)$$

where $x_{1a}$, $y_{1a}$ may be implicitly resolved from equations (11) and (14) and a different radius (a instead of r) may change the position coordinates as follows:

$$x_{1a} = (a/r) * x_1 \quad (22)$$

$$y_{1a} = (a/r) * y_1 \quad (23)$$

with $$\vartheta(u) = 2p/z * ((p+u)/p) \quad (24)$$

So, the absolute x position of point two (2) may be written as follows:

$$x_2 = a * \text{Sin}[\vartheta(u)] - e \quad (25)$$

and the absolute y position of point two (2) may be written as follows:

$$y_2 = a * \text{Cos}[\vartheta(u)] \quad (26)$$

The relative coordinate m of point two (2) on the STC sprocket 16 may be specificed as:

$$m(u) = -b * \text{Sin}[\gamma] = -b * \text{Sin}[p/2 - \vartheta(u)] \quad (27)$$

and the relative coordinate n of point two (2) on the STC sprocket 16 may be specified as:

$$n(u) = -b * \text{Cos}[\gamma] = -b * \text{Cos}[p/2 - \vartheta(u)] \quad (28)$$

Thus, the compensation curve 42 may be specified by the point two (2) and equations (27) and (28).

Figure 7:
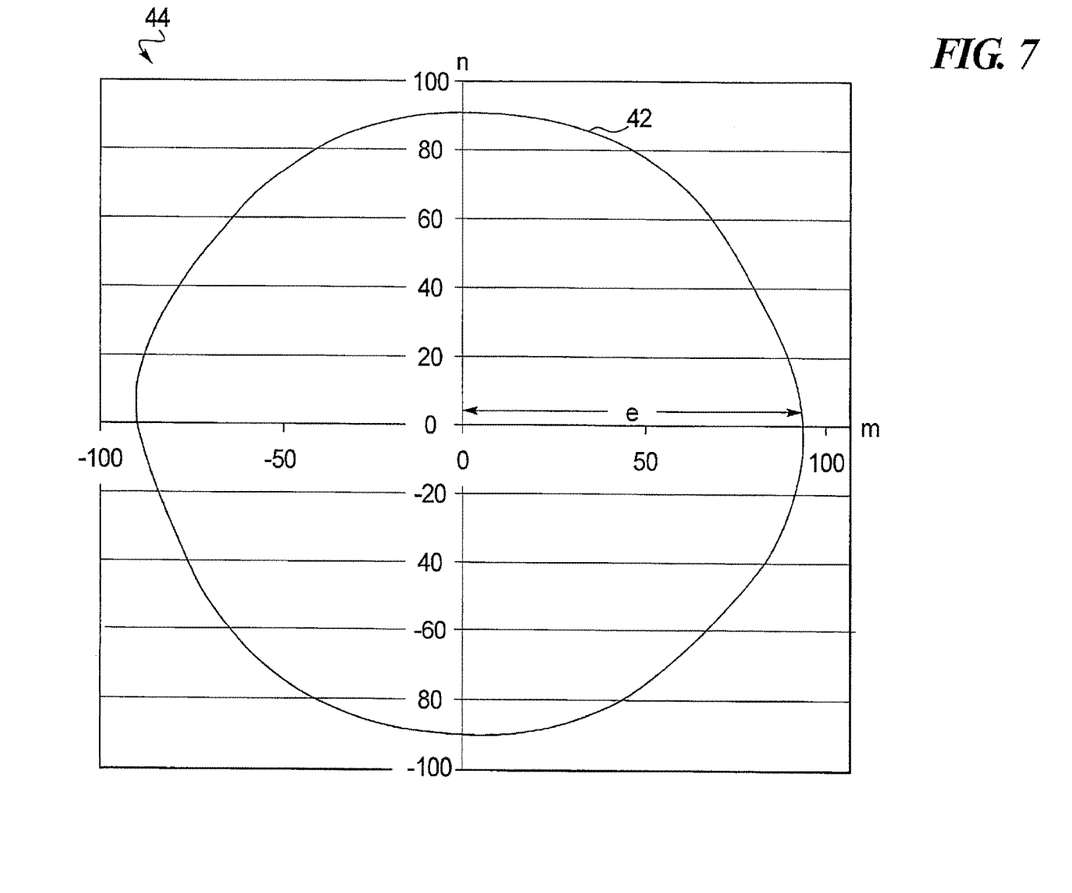
FIG. 7 shows an example of the geometry of the compensation curve of FIGS. 5 and 6.

An example 44 of the compensation curve 42 is shown in FIG. 7. In particular, the example 44 is created by the point two (2), described above, according to the equations (27) and (28) for an STC sprocket having five (5) teeth. Notwithstanding the fact that the present example 44 relates to an STC sprocket with five (5) teeth, a similar compensation curve may be expressed for the STC sprocket 16' having any number of teeth (e.g., the teeth 30).

When both the STC sprocket 16' and the MDC sprocket 24' rotate in the same direction with a constant angular velocity (e.g., the same average angular velocity), the compensation curve 42 may be described by a geometric shape, called a compensation circle (or geometric circle), having a radius "e" (See FIG. 7). This compensation circle may be used as a reference to ascertain the quality of the compensation curve 42. In particular, the less the compensation curve 42 deviates from the geometric circle (e.g., no sharp corners, sharp loops or self crossings) and amplitude (deviation), the smoother is the compensation curve. Deviations from the geometric circle are what compensate for the polygon effect.

In at least some embodiments, the polygon compensation coupling system 28 described above may effectively compensate the polygon effect in the passenger line (e.g., the side facing the passengers) of the passenger conveyor system 2, but may not compensate the polygon effect effectively in the return line (e.g., the side facing away from the passengers after turning 180° about the STC and the MDC sprockets 16' and 24', respectively) thereof. Accordingly, to effectively compensate the polygon effect in the return line, either an "open" link in which for one STC pitch length, the STC sprocket 16' is not guided and an STC joint between two links rotates freely or by revolving the moving joints in a curve that the STC links have to follow in the track (e.g., the transition arcs in escalators), may be provided at an "outlet" to the return line at the STC sprocket 16'. Furthermore, in addition to the polygon effect experienced by the passenger and the return lines, polygon effect can occur during deviations from a linear track of the STC sprocket 16 and may be dependent upon the shape and the location of the track deviation, the turning direction of the step chain 12, the pitch thereof and frequency of the step chain velocity changes.

Thus, in order to compensate for the polygon effect in the passenger line and the return line as well as to account for other deviations from a linear track, the polygon compensation coupling system 28 may be positioned at the apex of the arc. For example, when turning the step chain 12 with a constant speed of 180° in a circle return track, the compensation curve 42 may be defined at the apex of the arc bow (at 90°), which deviates only slightly from the geometry of the compensation circle described above, is symmetric to linear track lines and works to compensate the polygon effect in both STC drive directions (e.g., the passenger line and the return line) of the STC sprocket 24'. Thus, an STC sprocket 24' having a pitch of 135.46 millimeters and turning 180° degree in a circle of 190 millimeters diameter may define a compensation curve 42 at the apex which deviates about 4 millimeters in diametric direction and is very smooth, thereby effectively compensating for the polygon effect.

Figure 8:
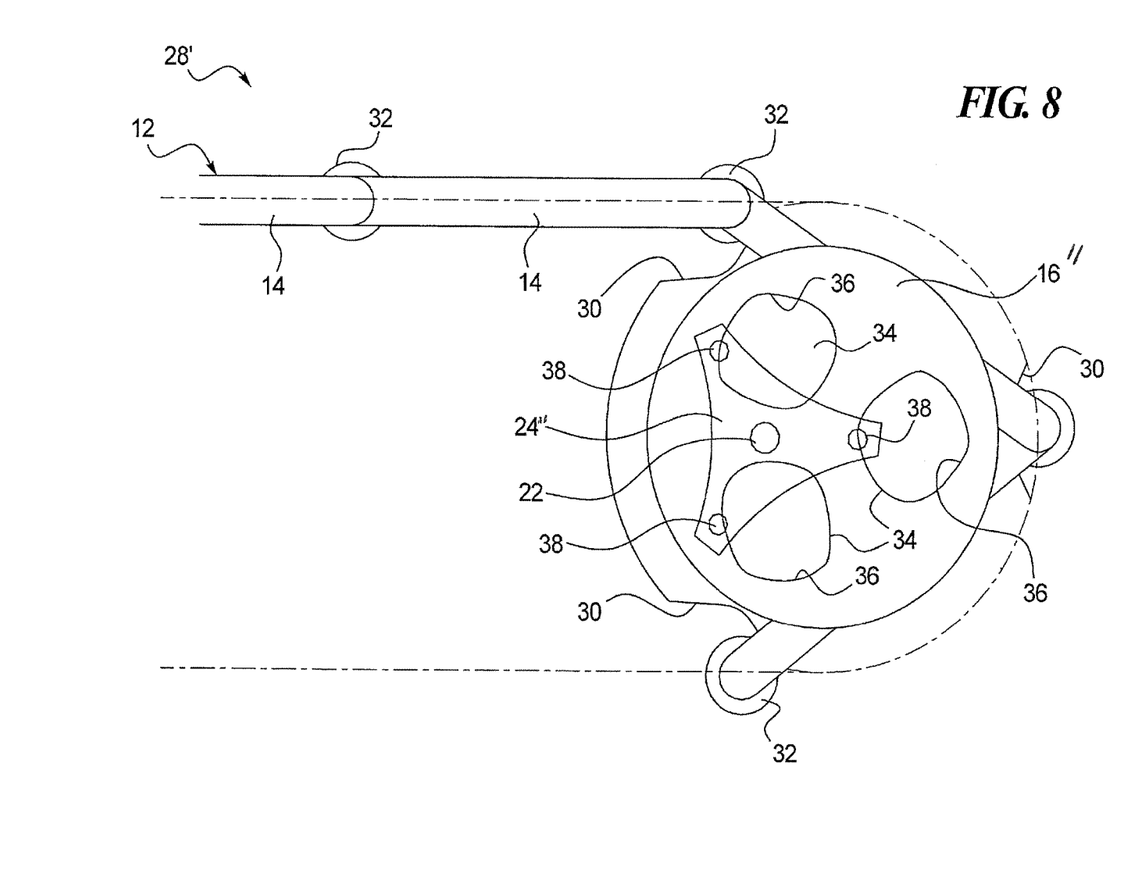
FIG. 8 is a schematic front view of a second embodiment of the polygon compensation coupling system of FIG. 3.

Referring now to FIG. 8, a schematic representation of a second embodiment of the polygon compensation coupling system 28 is shown as 28', in accordance with at least some embodiments of the present disclosure. To the extent that the polygon compensation coupling system 28' is substantially similar to the polygon compensation coupling system 28, only the differences between the two will be described here, for conciseness of expression. As shown, similar to the polygon compensation coupling system 28, the polygon compensation coupling system 28' may include the step chain 12 having the plurality of step chain links 14 and connecting links 32 that engage with the teeth 30 of the STC sprocket 16" as the step chain moves about the rotating STC sprocket. The STC sprocket 16" also has the three compensation holes 34, which define the compensation curve 42. In contrast to the polygon compensation coupling system 28 in which the MDC sprockets 24' are shown to be circular (or substantially circular), the polygon compensation coupling system 28' employs MDC sprockets 24' that are triangular (or substantially triangular) in shape and that may be driven substantially directly by way of gears, axles, motors and the like.

Although only one MDC sprocket 24″ is visible in FIG. 8, it will be understood that two of the MDC sprockets 24″ connected together may be employed as discussed above with respect to the MDC sprocket 24′. Furthermore, the MDC sprockets 24″ may operate and function substantially similarly to the MDC sprockets 24′ in that the MDC sprockets 24″ may employ the axles/rollers 38 and plates 40 (not visible) to engage the compensation holes 34 to move the STC sprocket 16″ in accordance with the defined compensation curve 42. The compensation curve 42 may be expressed by the equations (27) and (28) derived above.

It will also be understood that the MDC sprockets 24′ and 24″ are merely two examples of the kinds of MDC sprockets that may be employed for purposes of this disclosure. In other embodiments, several different configurations of the MDC sprocket that permit engagement with the STC sprocket 16″ and definition of the compensation curve 42 therewith as described above, may be employed and are considered within the scope of the present disclosure. Furthermore, in at least some embodiments, the MDC sprockets 24′ need not be employed at all. Rather, the engagement between the MDC sprockets 24′ and the STC sprocket 16″ may be defined between the belt or chain driven machine drive chain sprocket 25 (See FIG. 1B) and the STC sprocket 16″ such that the engagement between the machine drive chain sprocket and the STC sprocket defines the compensation curve 42. In alternate embodiments, the STC sprocket 16 may be driven directly by the main drive shaft 22 by way of belts and/or chains to define the compensation curve 42.

Figure 9:
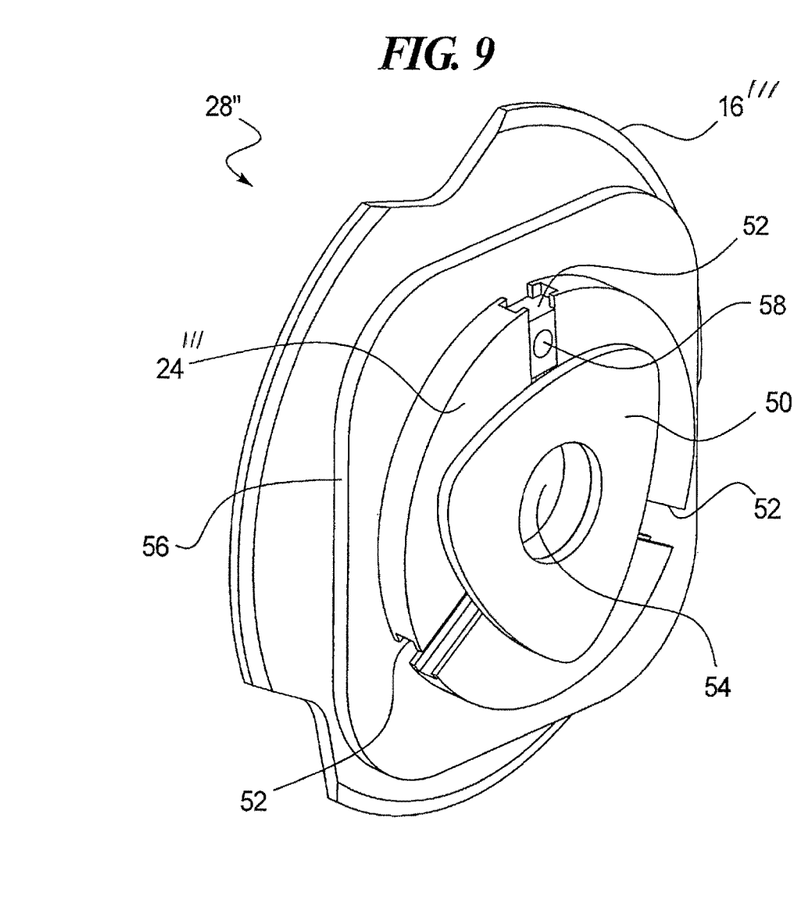
FIG. 9 shows a perspective view of a third embodiment of the polygon compensation coupling system of FIG. 3.
Figure 10A:
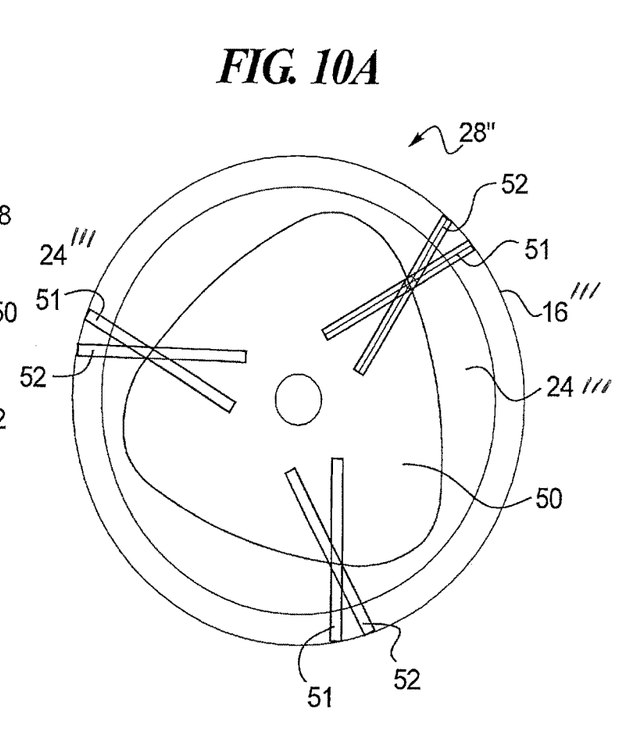
FIG. 10A shows a first schematic front view of the polygon compensation coupling system of FIG. 9.
Figure 10B:
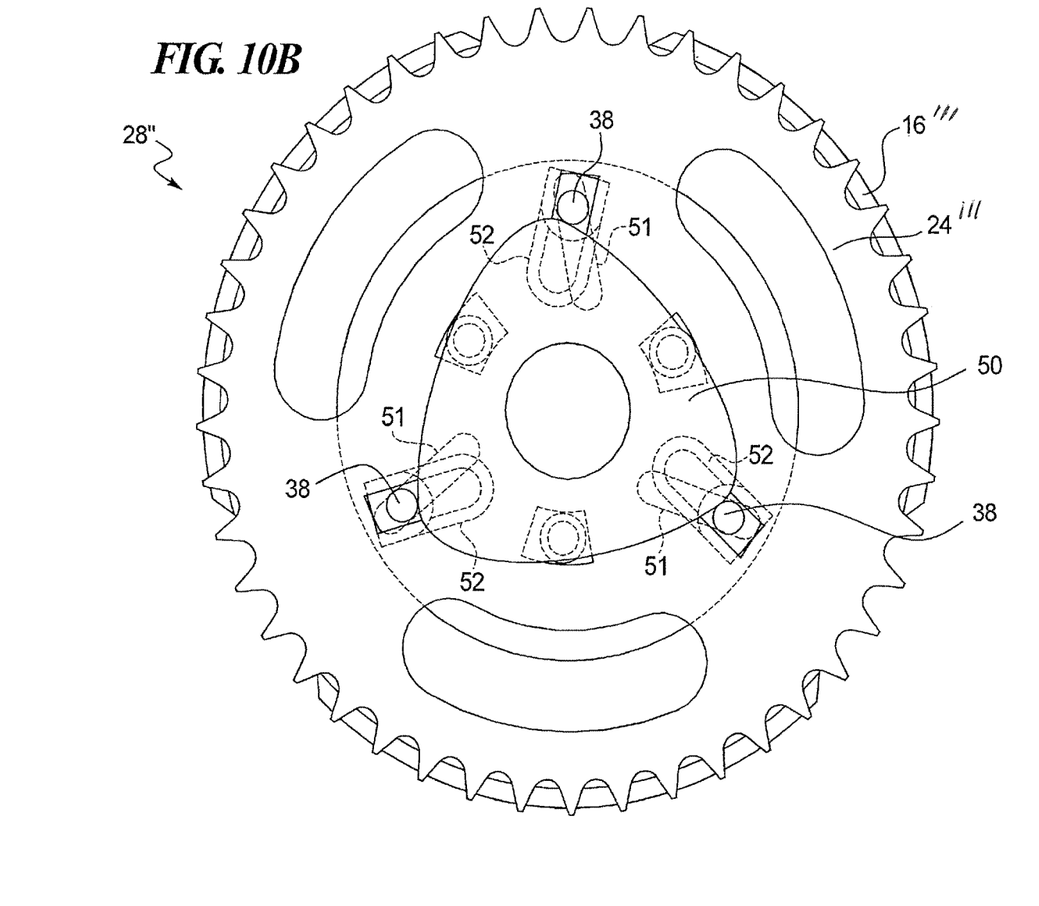
FIG. 10B shows a second schematic front view of the polygon compensation coupling system of FIG. 9.

Turning now to FIGS. 9 and 10A-10B, a third embodiment of the polygon compensation coupling system 28 is shown as 28″, in accordance with at least some embodiments of the present disclosure. In contrast to the polygon compensation coupling systems 28 and 28′, the polygon compensation coupling system 28″ employs a stationary plate 50 having a circumference that is defined by the determined compensation curve 42 above, as well as engagement surfaces (e.g., linear slots) 51 in the STC sprocket 16‴ and corresponding engagement surfaces (e.g., linear slots) 52 in the MDC sprockets 24‴ (only the linear slots in the MDC sprocket are visible in FIG. 9), all of which may be mounted to center around a common midpoint 54. The MDC sprocket 24‴ may be connected to the STC sprocket 16‴ by a way of a system fixation 56.

By virtue of the compensation curve 42 being fixed, it drives an engagement point 58 in a manner that the step chain 12 maintains a substantially constant linear speed when the MDC sprocket 24‴ and the STC sprocket 16‴ are rotated with the same (e.g., constant) average angular velocity but with different (e.g., non-constant) instantaneous angular velocities. In particular, the axles/rollers 38, or other low-friction elements, engage the surface of the stationary plate 50 (as shown more clearly in FIG. 10B) and slide in the linear slots 51 and 52 such that different angular motion of the STC and the MDC sprockets 16‴ and 24‴, respectively, is driven by the dynamic radial position of the rollers and the different angles of the linear slots. Specifically, the linear slots 51 and 52 of the STC sprocket 16‴ and the MDC sprocket 24‴, respectively, cross at a certain angle. This angle arrangement may press a compensation element midpoint, which may then be embodied in the movement of the rollers/axles 38, and onto the surface of the compensation curve 42 (going inside towards the center) of the fixed compensation part (e.g., the stationary plate 50). Alternatively, depending upon the angle described above, the compensation element midpoint may be pressed onto an opposite side of the compensation curve 42 (going outside), which in turn may result in a compensation hole (negative part of the shown fixed compensation part 50).

It will be understood that several other geometries for the linear slots 51 and 52 may be employed (e.g., arcs) and that the location and the position of those slots also can be relatively varied as well. Furthermore, in at least some embodiments, the compensation curve 42 may be determined by running the STC sprocket 16‴ and the MDC sprocket 24‴ at a constant speed for the specific geometry of the linear slots 51 and 52 and, determining the fixed compensation curve 42 for that speed. In such cases, the compensation curve 42 may be defined by differential equations, which may be derived in a manner similar to that described above.

Notwithstanding the fact that the engagement surfaces described above are linear slots 51 and 52, in other embodiments, the linear slots may be replaced by other configurations that permit definition of the compensation curve 42 (e.g., the fixed compensation curve), described above. Furthermore, although the polygon compensation coupling system 28 has been described above with respect to the passenger conveyor system 2, it will be understood that the teachings of the present disclosure are considered applicable to any chain and sprocket driven systems, which experience the polygon effect and to reduce the polygon effect thereof.

INDUSTRIAL APPLICABILITY

In general, the present disclosure sets forth a polygon compensation coupling system for minimizing (or possibly even completely eliminating) a polygon effect encountered by chain driven systems, such as, passenger conveyor systems. In particular, in some embodiments, the polygon compensation coupling system involves providing an STC sprocket with compensation holes and engaging at least one MDC sprocket with the STC sprocket by way of axles or rollers, such that the as the STC sprocket and the MDC sprocket rotate, the axles or rollers rotate within the compensation holes to define a compensation curve. In other embodiments, the polygon compensation coupling system involves providing both the STC sprocket and the MDC sprocket with linear slots that follow a fixed compensation curve provided by a stationary plate having the circumference of the desired compensation curve.

By virtue of defining the compensation curve, the STC sprocket may be rotated with changing angular velocities such that a constant linear speed of the step chain may be maintained as it moves about the rotating STC sprocket. Thus, the polygon effect, which stems from the relative speed differentials of the moving step chain having discrete links engaging a toothed sprocket, may be reduced (or possibly completely eliminated) insofar as the speed of the step chain may now be continuous and substantially constant. The substantially constant speed of the step chain may additionally be ensured by rotating the MDC sprocket and the STC sprocket with a constant average angular velocity but non-constant instantaneous angular velocities (as a result of the compensation curve). Thus, by reducing the polygon effect, the riding experience of a passenger may be enhanced.

Furthermore, the polygon compensation coupling system provides a mechanism for reducing the polygon effect without reducing the pitch of the step chain (requiring greater number of step chain links), as taught by conventional polygon effect reducing solutions, described above. Accordingly, the higher cost associated with the step chain and the STC sprocket (stemming from increased number of parts, increased maintenance and shorter life span) of traditional solutions may also be minimized Thus, the polygon compensation coupling of the present disclosure not only ensures a longer lifespan and a cost reduction of the step chain and the STC sprocket, it also provides a greener approach to reducing the polygon effect due to fewer joints requiring lesser lubricant and a noise-free operation. Additionally, the polygon compensation coupling mechanism is reliable, robust and easily maintainable.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A polygon compensation coupling system, the system comprising:
   a chain sprocket; and
   a main drive chain sprocket in engagement with the chain sprocket, the engagement defined by a compensation curve to reduce a polygon effect;
   wherein the chain sprocket comprises a plurality of compensation holes;
   wherein the main drive chain sprocket comprises a plurality of axles, the main drive chain sprocket is engaged to the chain sprocket through each of the plurality of compensation holes by a respective axle of the plurality of axles, wherein rotation of the main drive chain sprocket causes rotation of each of the respective axles within each of the plurality of compensation holes in accordance with the compensation curve.

2. The polygon compensation coupling system of claim 1, wherein each of the plurality of compensation holes are approximately equally spaced circumferentially apart from one another.

3. The polygon compensation coupling system of claim 1, wherein the main drive chain sprocket and the chain sprocket are mounted to a main drive shaft for rotation.

4. The polygon compensation coupling system of claim 1, wherein the chain sprocket and the main drive chain sprocket rotate with constant average angular velocity.

5. The polygon compensation coupling system of claim 1, wherein the chain sprocket and the main drive chain sprocket rotate with non-constant instantaneous angular velocities.

6. The polygon compensation coupling system of claim 1, wherein the chain sprocket and the main drive chain sprocket have non-constant instantaneous angular velocities while maintaining constant average angular velocities.

7. The polygon compensation coupling system of claim 6, wherein the non-constant instantaneous angular velocities of the main drive chain sprocket and the chain sprocket causes a linear speed of a chain to be kept substantially constant.

8. The polygon compensation coupling system of claim 1, wherein the main drive chain sprocket is driven substantially directly by way of gears, axles, and/or motors.

9. A passenger conveyor system, the system comprising:
   a plurality of treads guided by a step chain in an endless loop about a step chain sprocket for transporting objects from one location to another; and
   a main drive chain sprocket in engagement with the step chain sprocket, the engagement defined by a compensation curve as the step chain sprocket and the main drive chain sprocket rotate with constant average angular velocities but non-constant instantaneous angular velocities;
   wherein the step chain sprocket comprises a plurality of compensation holes and the main drive chain sprocket comprises a plurality of axles, the main drive chain sprocket is engaged to the step chain sprocket through each of the plurality of compensation holes by a respective axle of the plurality of axles, such that rotation of the main drive chain sprocket causes rotation of each of the respective axle within each of the plurality of compensation holes in accordance with the compensation curve.

10. The passenger conveyor system of claim 9, wherein the step chain moves with a constant linear speed.

11. The passenger conveyor system of claim 9, wherein the main drive chain sprocket comprises a first main drive sprocket and a second main drive sprocket, the first and the second main drive sprockets sandwiching the step chain sprocket.

12. A method of reducing a polygon effect in a chain driven system, the method comprising:
   providing a chain driven by a chain sprocket and a main drive;
   engaging the chain sprocket with the main drive chain sprocket;
   rotating the chain sprocket and the main drive with constant average angular velocities but non-constant instantaneous angular velocities; and
   providing a compensation curve to maintain a substantially constant linear speed of the chain;
   wherein providing the chain sprocket comprises providing the chain sprocket with a plurality of compensation holes and, engaging the chain sprocket with the main drive chain sprocket comprises connecting the main drive chain sprocket to the chain sprocket through the plurality of compensation holes by way of a plurality of axles mounted on the main drive chain sprocket;
   wherein providing the compensation curve further comprises guiding the plurality of axles within the plurality of compensation holes.

* * * * *